United States Patent
Lin et al.

(10) Patent No.: US 7,242,435 B2
(45) Date of Patent: Jul. 10, 2007

(54) METHOD FOR MOTION PIXEL DETECTION WITH ADAPTIVE THRESHOLDS

(75) Inventors: Wen-Kuo Lin, Taipei (TW); Chung-Yen Lu, Taipei (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 555 days.

(21) Appl. No.: 10/418,198

(22) Filed: Apr. 18, 2003

(65) Prior Publication Data
US 2004/0208384 A1   Oct. 21, 2004

(51) Int. Cl.
*H04N 7/01* (2006.01)
*H04N 11/20* (2006.01)

(52) U.S. Cl. .................. 348/448; 348/441; 348/452

(58) Field of Classification Search ................ 348/448, 348/441, 452, 459, 457, 458, 616, 620, 699, 348/700; H04N 7/01, 11/20
See application file for complete search history.

(56) References Cited

U.S. PATENT DOCUMENTS

| | | | | |
|---|---|---|---|---|
| 5,579,054 A * | 11/1996 | Sezan et al. | | 348/452 |
| 6,459,455 B1 * | 10/2002 | Jiang et al. | | 348/452 |
| 6,661,464 B1 * | 12/2003 | Kokkosoulis et al. | | 348/448 |
| 6,992,725 B2 * | 1/2006 | Mohsenian | | 348/448 |
| 7,042,512 B2 * | 5/2006 | Yang et al. | | 348/452 |

* cited by examiner

*Primary Examiner*—Trang Tran
(74) *Attorney, Agent, or Firm*—Troxell Law Office, PLLC

(57) ABSTRACT

A method for motion pixel detection with adaptive thresholds, according to the global motion information among the reference video fields, so as to correctly evaluate whether a missing pixel is in a static region or a non-static region, thereby reconstructing the missing pixel by an inter-field interpolation process or an intra-field interpolation process. If the amount of motion among the reference fields is large, there is high motion information among the reference fields, so the threshold is set to be small; if the amount is small, there is less motion information between the reference fields, and so the threshold should be set to be large.

20 Claims, 8 Drawing Sheets

METHOD FOR MOTION PIXEL DETECTION WITH ADAPTIVE THRESHOLDS

BACKGROUND OF THE INVENTION

1. Field of the Invention

The present invention generally relates to a method for motion pixel detection and, more particularly, to a method for motion pixel detection with adaptive thresholds so as to correctly evaluate whether a missing pixel is in a static region or in a non-static region, thereby reconstructing the missing pixel by an inter-field interpolation process or an intra-field interpolation process, respectively.

2. Description of the Prior Art

In the prior art, a motion-adaptive algorithm is used to reconstruct a missing pixel based on whether the missing pixel locates in a static region or a non-static region. More particularly, if the missing pixel is evaluated to locate in a static region, an inter-field interpolation process is exploited to reconstruct the missing pixel by referring to the information in the neighboring fields; on the other hand, if the missing pixel is evaluated to locate in a non-static region, then intra-field interpolation process is employed to reconstruct the missing pixel by referring to the information in the neighboring original scan lines of the same field.

Please refer to FIG. 1A, which is a schematic diagram showing an inter-field interpolation process in the prior art. As shown in FIG. 1A, a missing pixel 10 denoted by the "X" symbol is to be interpolated and is in the field F(n), while the preceding pixel 11 and the next pixel 13 are both denoted as "O" and are the original pixels in the fields F(n−1) and F(n+1), respectively. The coordinates of these three pixels are expressed as (x,y). The missing pixel 10 and the neighboring pixels 11 and 13 are at different time instance. Therefore, in the inter-field interpolation process, the missing pixel 10 is reconstructed by averaging the value of pixel 111 and the value of pixel 13, that is:

$$X = \frac{[F(x, y, n-1) + F(x, y, n+1)]}{2} \quad \text{(EQ. 1)}$$

wherein F(x,y,n−1) is the expression for the preceding pixel 11 and F(x,y,n+1) is the expression for the next pixel 13.

Please further refer to FIG. 1B, which is a schematic diagram showing an intra-field interpolation process in the prior art. As shown in FIG. 1B, a missing pixel 10 denoted by the "X" symbol is to be interpolated and is in the field F(n), while the pixel 14 and the pixel 16 are both denoted as "O" and are the original pixels in the same field F(n). The coordinates of the first pixel 14, the missing pixel 10 and the second pixel 16 are expressed as (x,y−1), (x,y), and (x,y+1), respectively. The missing pixel 10, the first pixel 14 and the second pixel 16 are at different locations in the y-orientation. Therefore, in the intra-field interpolation process the missing pixel 10 is reconstructed by averaging the value of pixel 14 and the value of pixel 16, that is:

$$X = \frac{[F(x, y-1, n) + F(x, y+1, n)]}{2} \quad \text{(EQ. 2)}$$

wherein F(x,y−1,n) is the expression for the first pixel 14 and F(x,y+1,n) is the expression for the second pixel 16.

To evaluate whether the missing pixel 10 locates in a static region or in a non-static region, the difference of the surrounding regions in the neighboring fields is calculated. If the difference is smaller than a threshold, the region surrounding the missing pixel 10 is recognized as a static region, implying the missing pixel 10 is in a static region. Whereas, if the difference is larger than the threshold, the region surrounding the missing pixel 10 is recognized as a non-static region, implying the missing pixel 10 is in a non-static region.

To calculate the difference between the surrounding regions in the neighboring fields, a conventional method referred to as the sum of absolute difference (SAD) is employed. Please refer to FIG. 2, which is a schematic diagram showing the conventional method. As shown in FIG. 2, a missing pixel 20 denoted by the "X" symbol is to be interpolated and is in the field F(n), while a plurality of neighboring pixels, denoted as "O", are the original pixels in the fields F(n−1) 21 and F(n+1) 23. Therefore, the missing pixel 20 can be reconstructed by employing the inter-field interpolation process as shown in FIG. 1A and the intra-field interpolation process as shown in FIG. 1B. More particularly, the region difference "Diff(x,y,n)" is given by:

$$\text{Diff}(x, y, n) = \sum_{(i,j) \in \Gamma} |f(i, j, n-1) - f(i, j, n+1)| \quad \text{(EQ. 3)}$$

where F(.) denotes the original pixels, and $$\Gamma = \{(x,y-2),(x,y+2),(x-1,y),(x+1,y)\}.$$

It is noted that $\Sigma |f(i,j,n-1)-f(i,j,n+1)|$ is the sum of absolute difference between the original pixels in the fields f(n−1) 21 and f(n+1) 23. More particularly, f(i,j,n−1) denotes the pixels in the field F(n−1) 21, while f(i,j,n+1) denotes the pixels in the field F(n+1) 23. Furthermore, (i,j) represents the locations of the pixels at the coordinates of, (x,y−2), (x,y), (x,y+2), (x−1,y), and (x+1,y).

The related art of the motion-adaptive de-interlacing algorithm is presented by a flow chart shown in FIG. 3. To begin with, field F(n) is to be de-interlaced (step 301). A de-interlacing processor inputs the current field F(n), the preceding field F(n−1), and the next field F(n+1) (step 303). After that, the missing pixels in field F(n) is scanned and interpolated in the raster order, from top-left to bottom-right (step 305). In order to evaluate whether the region surrounding a missing pixel is a static region or not, the region difference Diff is calculated (step 307) and then compared with a threshold (step 309). If the difference Diff is smaller than the threshold, the missing pixel is reconstructed by using the inter-field interpolation process as discussed with reference to FIG. 1A (step 311); otherwise, if the difference Diff is larger than or equal to the threshold, then the missing pixel is reconstructed by using the intra-field interpolation process as discussed with reference to FIG. 1B (step 313). After that, the de-interlaced pixel is output (step 315) and whether the pixel scanning process has reached the end of field F(n) is evaluated (step 317). If yes, the field F(n) is stopped being de-interlaced (step 319); otherwise, the procedure returns to step 305 and these static region detection and interpolation processes repeat until all the missing pixels in field F(n) have been reconstructed.

Even though the afore-mentioned motion-adaptive de-interlacing algorithm is easy to implement, the evaluation of a static region or a non-static region using a fixed threshold may only reflect the localized motion information to that region. This may, in turn, lead to a wrong evaluation if the region contains noise, such as those caused by the data format conversion. In other words, the difference between regions in the two neighboring fields that contain noise may be larger than the threshold. Consequently, the intra-field interpolation process would be used to reconstruct the missing pixels, which locate in a static region and should be reconstructed using the inter-field interpolation process. In the case that only some sparse pixels in the static region are reconstructed using the intra-field interpolation process, the reconstruction errors would be hardly recognizable. However, if a group of pixels in the static region are reconstructed using the intra-field interpolation process, the reconstruction errors could result in some very noticeable flickering artefacts.

Therefore, there is a need to provide a method for motion pixels detection with adaptive thresholds so as to correctly evaluate whether a missing pixel is in a static region or in a non-static region.

SUMMARY OF THE INVENTION

It is a primary object of the present invention to provide a method for motion pixel detection with adaptive thresholds so as to correctly evaluate whether a missing pixel is in a static region or in a non-static region, thereby reconstructing the missing pixel by an inter-field interpolation process or an intra-field interpolation process, respectively.

In order to demonstrate the foregoing object of the present invention, the present invention is implemented into a motion-adaptive de-interlacing algorithm, comprising the following steps: de-interlacing said video field; inputting said field being de-interlaced, and a plurality of reference fields; evaluating the amount of motion among said reference fields; adaptively adjusting a threshold according to said amount of motion among said reference fields; scanning said missing pixel and performing interpolation in a raster order; calculating a difference between pixels neighboring said missing pixel; comparing said difference with a threshold; reconstructing said missing pixel by using an inter-field interpolation process if said difference is smaller than said threshold; reconstructing said missing pixel by using an intra-field interpolation process if said difference is larger than or equal to said threshold; outputting a reconstructed de-interlaced pixel; evaluating whether the end of said field being de-interlaced is reached; and returning to scanning said missing pixels if yes; otherwise stopping de-interlacing said field.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention provides a method for motion pixels detection with adaptive thresholds that can be exemplified by the preferred embodiments as described hereinafter.

Figure 4:
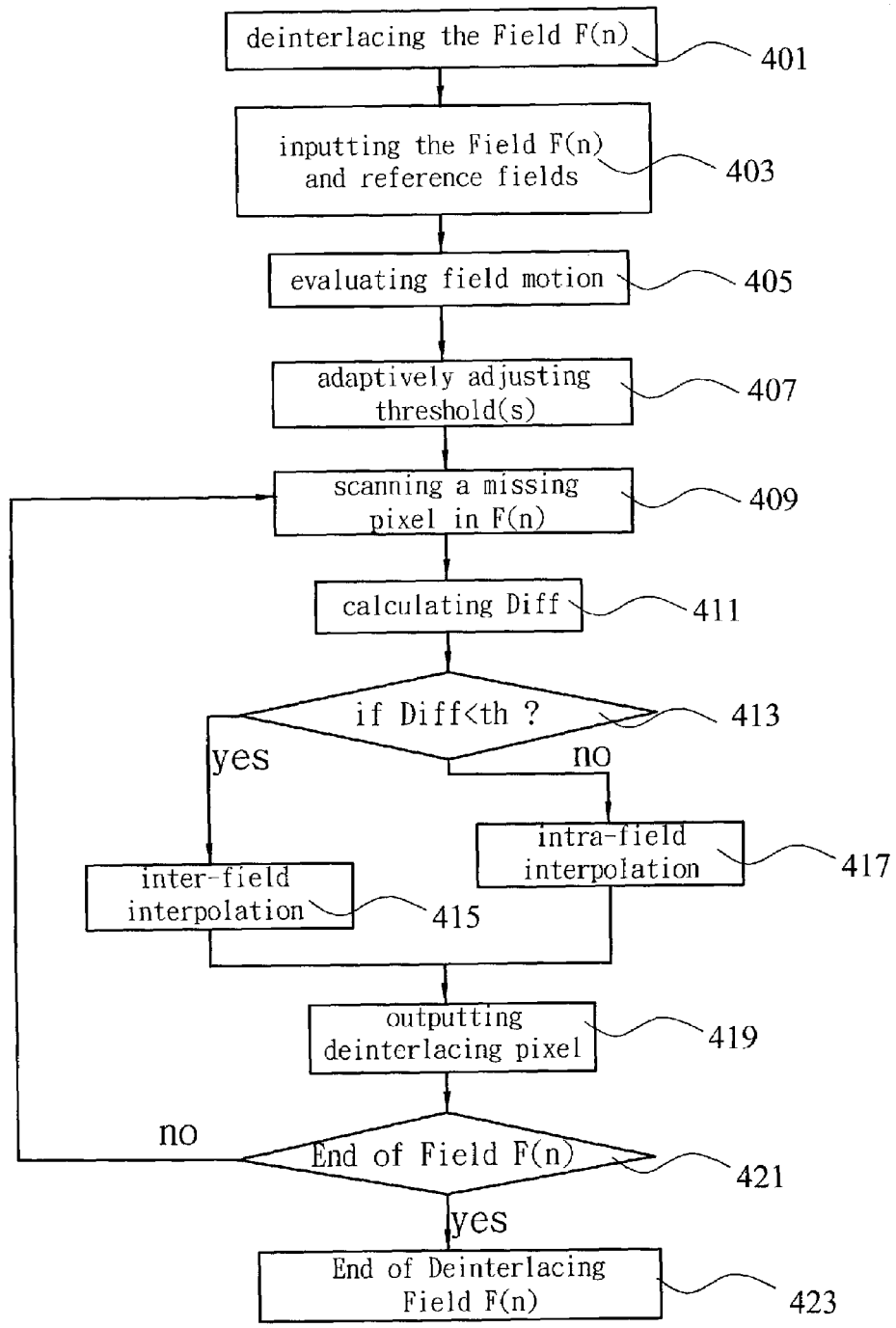
FIG. 4 is a flow chart showing a motion-adaptive de-interlacing algorithm with adaptive thresholds in accordance with one preferred embodiment of the present invention.

To start with, please refer to FIG. 4, which is a flow chart showing a motion-adaptive de-interlacing algorithm with adaptive thresholds in accordance with one preferred embodiment of the present invention. The present invention is based on the presumption that the noises affecting the static region can be suppressed by varying the threshold(s) according the global motion information among the reference video fields. In FIG. 4, the field F(n) is to be de-interlaced (step 401). A de-interlacing processor inputs the current field F(n) and neighboring reference fields (step 403). After that, the amount of motion among the reference fields is evaluated (step 405), so as to adaptively adjust a threshold (step 407). Then, the missing pixels in the field F(n) are scanned and interpolated in the raster order, from top-left to bottom-right (step 409), and the missing pixels are those pixels discarded in frame-to-field conversion for current said video field being de-interlaced.

In order to evaluate whether the region surrounding the missing pixel is a static region or a non-static region, a difference Diff is calculated (step 411) by using $$\text{Diff}(x, y, n) = \sum_{(i,j)\in\Gamma} |f(i, j, n-1) - f(i, j, n+1)|.$$

The calculated difference is then compared with a threshold (step 413) so as to evaluate whether the missing pixel is in a static region or a non-static region.

Figure 1A:
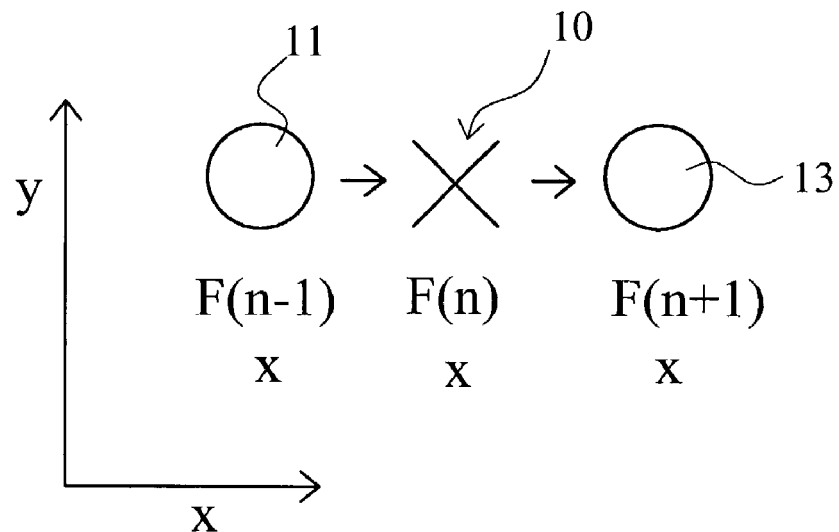
FIG. 1A is a schematic diagram showing an inter-field interpolation process in the prior art.
Figure 1B:
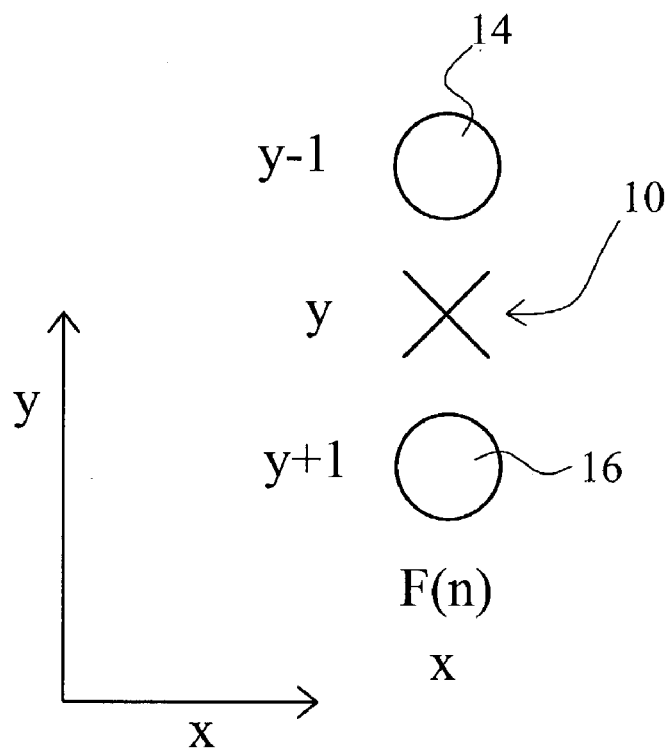
FIG. 1B is a schematic diagram showing an intra-field interpolation process in the prior art.
Figure 2:
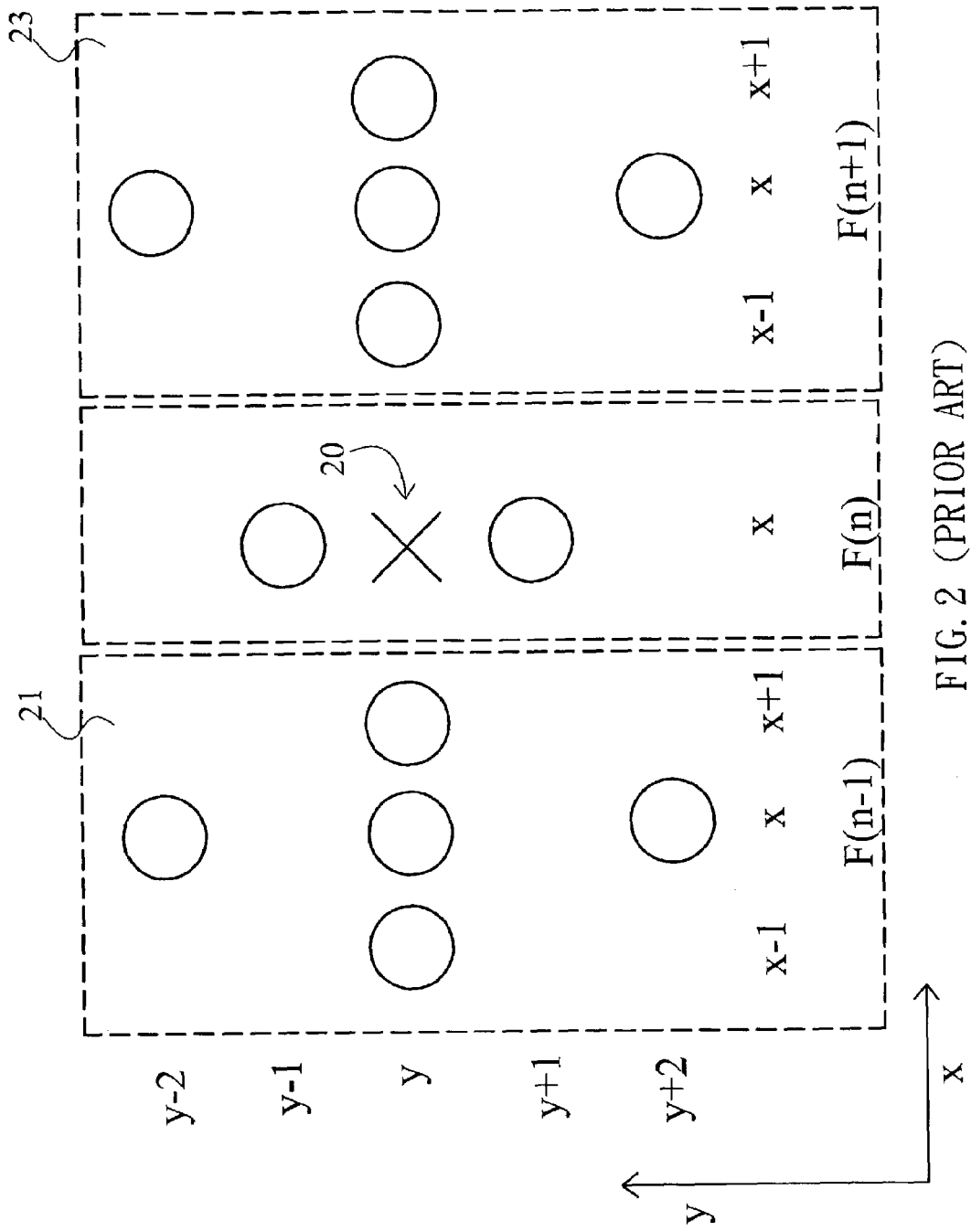
FIG. 2 is a schematic diagram showing the pixels referred conventionally in calculating the sum of absolute difference (SAD) in the prior art.
Figure 3:
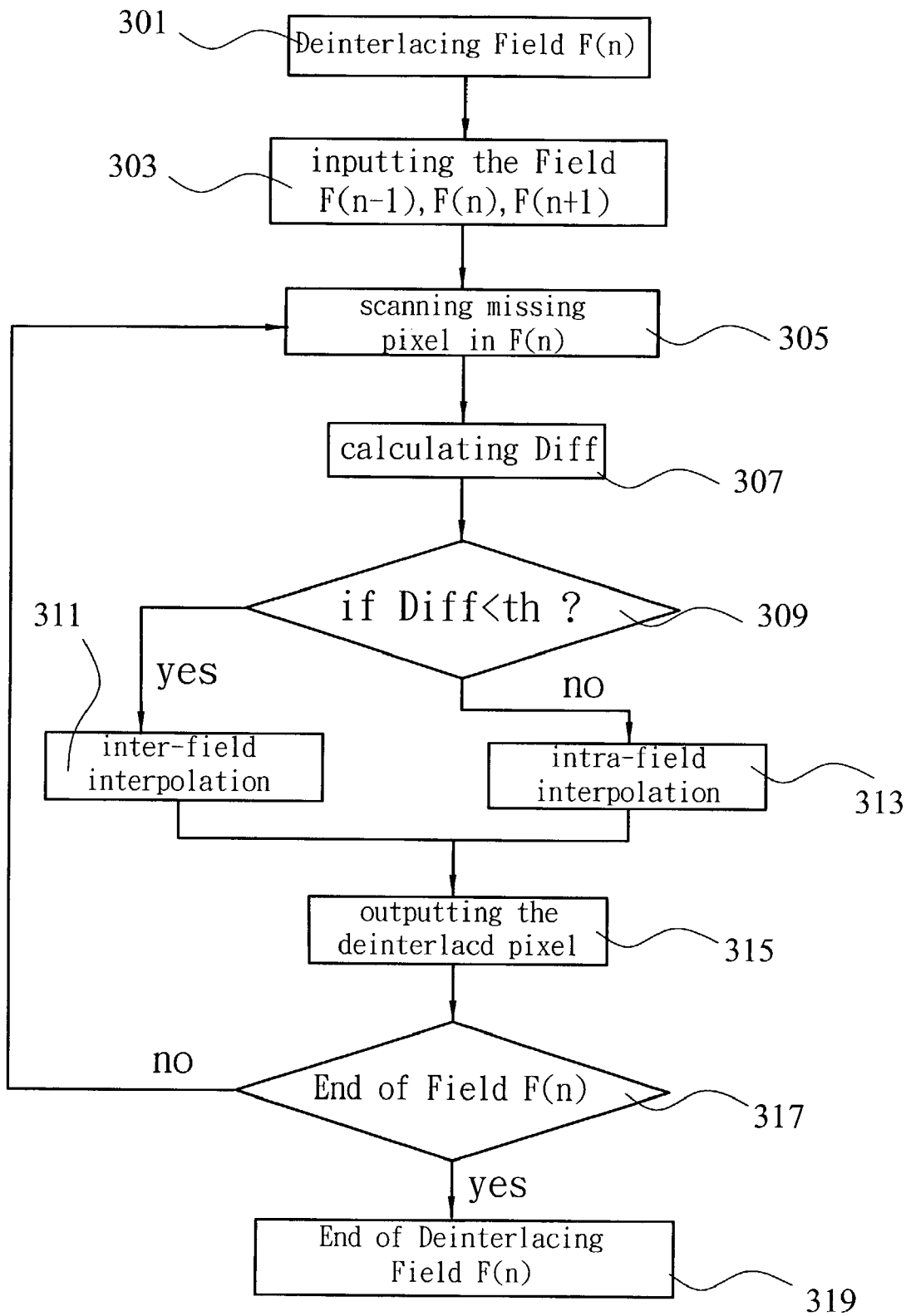
FIG. 3 is a flow chart showing a motion-adaptive de-interlacing algorithm in the prior art.

If the difference Diff is smaller than the threshold, the region where the missing pixel locates is a static region, and therefore the missing pixel is reconstructed by using an inter-field interpolation process as discussed with reference to FIG. 1A (step 415); however, if the difference Diff is larger than or equal to the threshold, the region where the missing pixel locates contains motion, and therefore the missing pixel is reconstructed by using the intra-field interpolation process as discussed with reference to FIG. 1B (step 417).

After that, the reconstructed de-interlaced pixel is output (step 419) and whether the end of field F(n) is reached is evaluated (step 421). If yes, field F(n) is stopped being de-interlaced (step 423); otherwise, the procedure returns to step 409 and these static region detection and interpolation processes repeat until all the missing pixels in field F(n) have been reconstructed.

Figure 5:
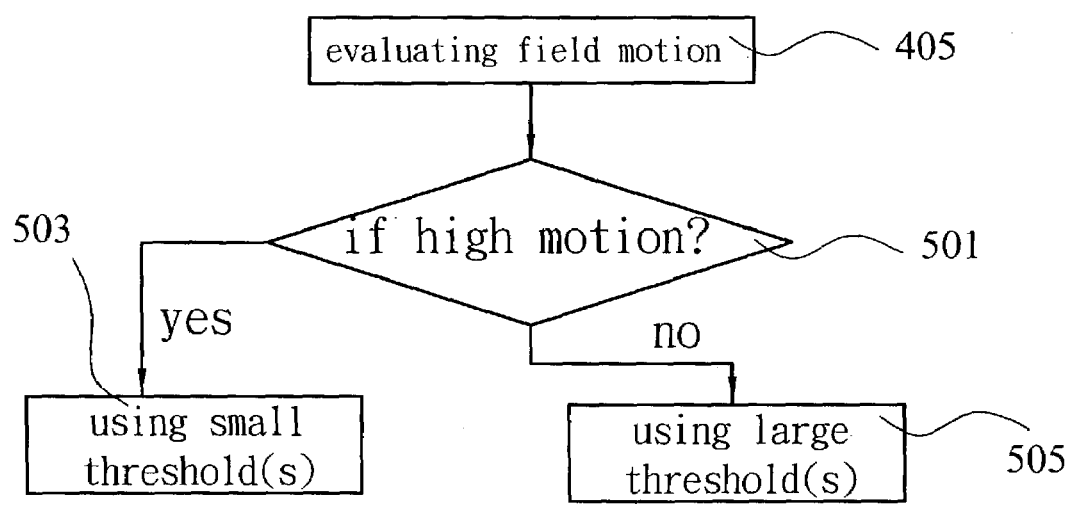
FIG. 5 a flow chart showing motion information evaluation and threshold adjustment in accordance with one preferred embodiment of the present invention.

More particularly, in FIG. 5, a flow chart showing motion information evaluation and threshold adjustment is illustrated in FIG. 4. To begin with, the amount of motion among the reference fields is evaluated (step 405). If the amount of motion among the reference fields is large (step 501), there is high motion information among the reference fields. Therefore, due to the masking effect, the influence of noise in the static region evaluation would be comparatively smaller than the motion information, so the threshold is set to small (step 503). On the other hand, if the amount of motion among the reference fields is small (step 501), there is less motion information between the reference fields. Hence, due to the facilitation effect, the influence of noise in the static region evaluation would be significantly larger than the low motion information, so the threshold should be set to large (step 505).

In accordance with another preferred embodiment of the present invention, the amount of motion among the current field and the reference fields is obtained by calculating a total field difference FieldDiff summed up by one field difference between the current field and the reference field of the same parity, and another field difference between the reference fields with opposite parity to the current field. That means the amount of motion information among the reference fields is evaluated from the total field difference FieldDiff. In the present embodiment, the field difference FieldDiff is obtained by calculating the sum of absolute difference (SAD). Therefore, FieldDiff is given by:

$$FieldDiff = \sum_{y=0}^{(M/2)-1} \sum_{x=0}^{N-1} |F(x, 2y, n) - F(x, 2y, n-2)| + \sum_{y=0}^{(M/2)-1} \sum_{x=0}^{N-1} |F(x, 2y+1, n-1) - F(x, 2y+1, n+1)| \quad \text{(EQ. 4)}$$

where F(n) and F(n−2) are the top fields, F(n−1) and F(n+1) are the bottom fields, and M and N are the frame height and frame width respectively. The threshold(s) can be adjusted according to the field difference FieldDiff. If the field difference FieldDiff is larger than a motion threshold motion_th, there is high motion information among these four fields, so the threshold used in the static region evaluation is set to small. On the other hand, if the field difference FieldDiff is smaller than the motion threshold motion_th, there is less motion information among these four fields, so the threshold used in the static region evaluation is set to large.

Figure 6:
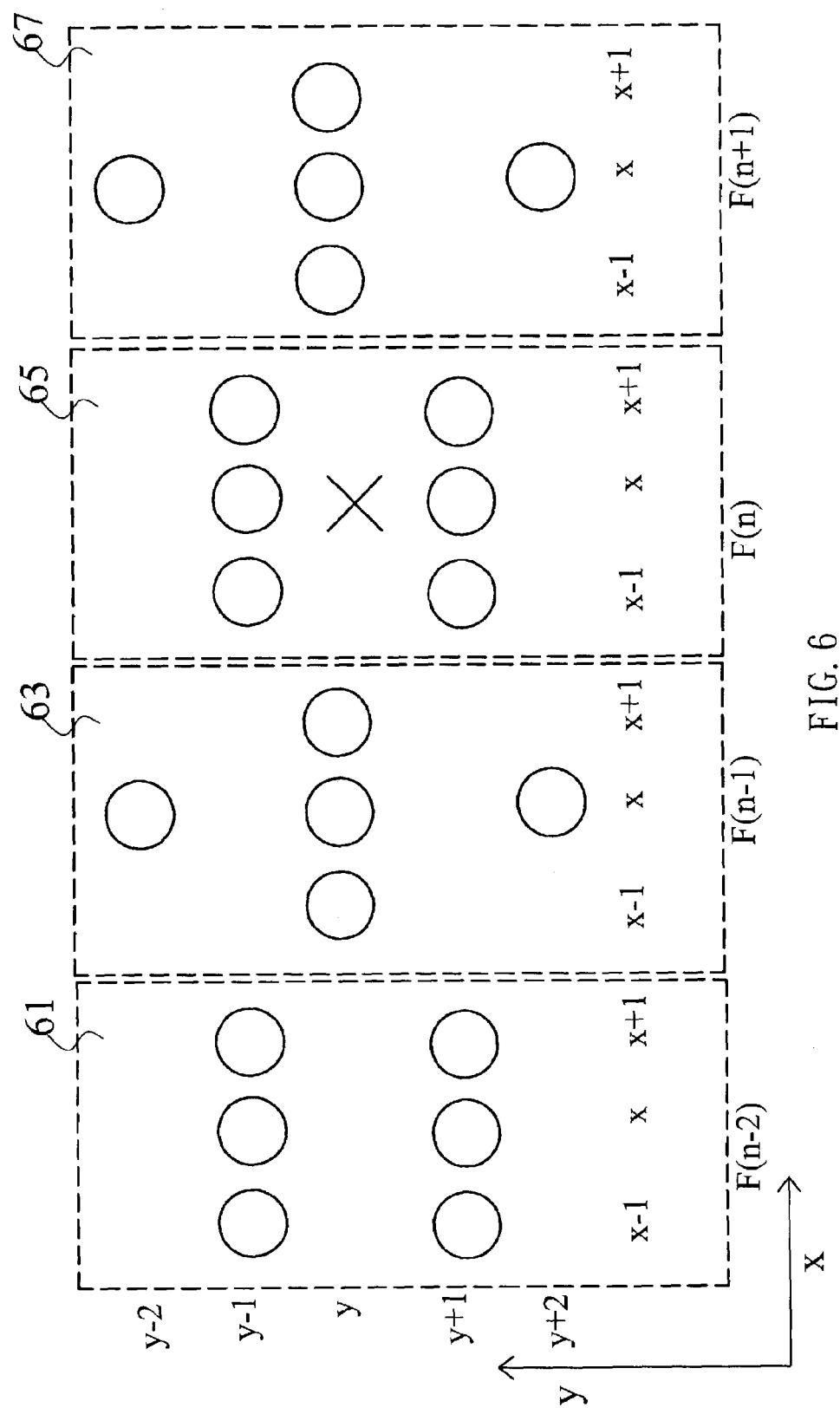
FIG. 6 is a schematic diagram showing a method for calculating the region difference in accordance with another preferred embodiment of the present invention.

To improve the accuracy, the region difference calculation for both top and bottom fields exploits four video fields, giving a more robustness static region evaluation. Please refer to FIG. 6, which is a schematic diagram showing a method for calculating the region difference in another embodiment of the present invention. The reference fields are a plurality of preceding fields prior to the current field and one next field posterior to current field if the current field is a top-field, and one preceding fields prior to the current field and a plurality of next field posterior to the current field if the current field is a bottom-field. As shown in FIG. 6, the four fields are the first field F(n−2) 61, the second field F(n−1) 63, the third field F(n) 65 and the fourth field F(n+1) 67. Therefore, the field to be de-interlaced is F(n) 65 and the reference fields are F(n−2) 61, F(n−1) 63 and F(n+1) 67. More particularly, the third field F(n) 65 is the current field, the first field F(n−2) 61 is the one before the preceding field, the second field F(n−1) 63 is the preceding field, and the fourth field F(n+1) 67 is the next field. For calculating a first difference Diff1 among pixels neighboring each of missing pixels in current field and the reference fields of the same parity as the field, and for calculating a second difference Diff2 among pixels neighboring each of missing pixels in current field and the reference fields of the opposite parity to the field. That means, the first difference Diff1 is calculated using these pixel locations in the first field F(n−2) 61 and the third field F(n) 65, while the second difference Diff2 is calculated using these pixel locations in the second field F(n−1) 63 and the fourth field F(n+1) 67. Diff1 and Diff2 are respectively expressed as:

$$Diff1(x, y, n) = \sum_{(i,j)\in \Gamma 1} |f(i, j, n) - f(i, j, n-2)| \quad \text{(EQ. 5)}$$

$$Diff2(x, y, n) = \sum_{(i,j)\in \Gamma 2} |(i, j, n-1) - f(i, j, n+1)| \quad \text{(EQ. 6)}$$

where F(.) denotes pixels used for calculation and

Γ1={(x−1,y−1),(x,y−1),(x+1,y−1),(x−1,y+1), (x,+1,y)}.

Γ2={(x, y−2),(x,y),(x,y+2),(x−1,y),(x+1,y)}.

Figure 7:
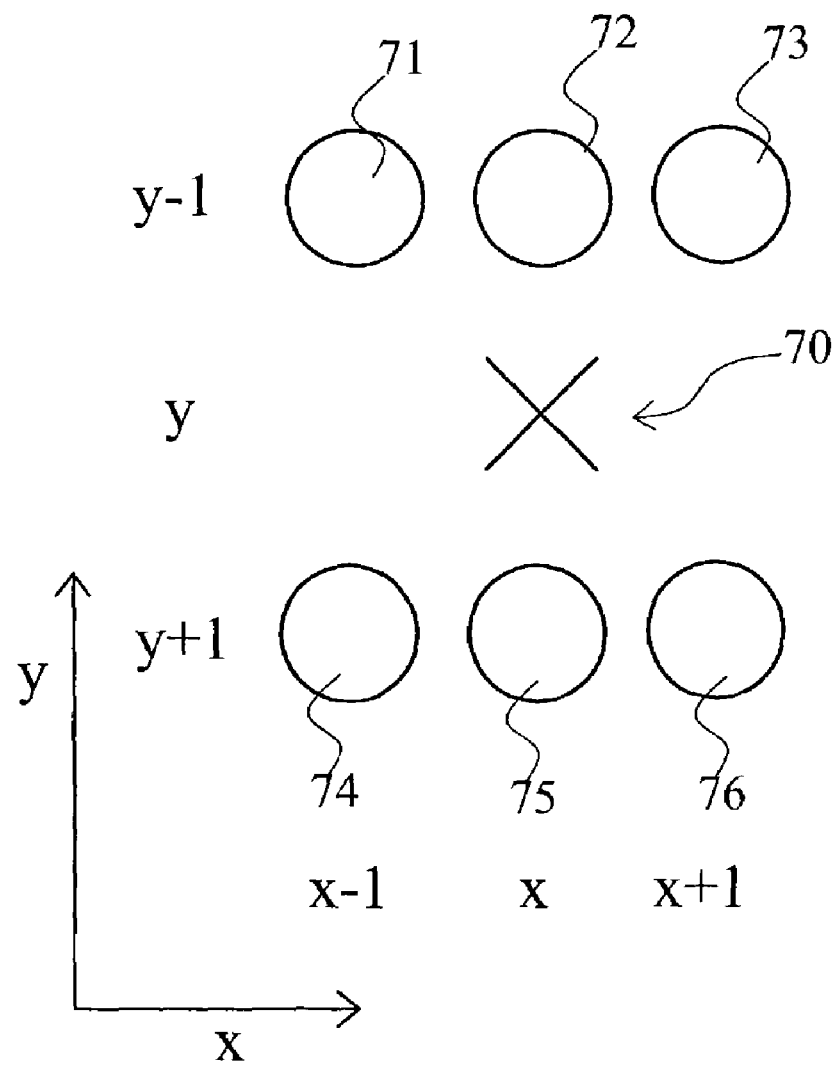
FIG. 7 is a schematic diagram showing an edge-oriented interpolation process in accordance with another preferred embodiment of the present invention.

FIG. 7 is a schematic diagram showing the edge-oriented intra-field interpolation in accordance with another preferred embodiment of the present invention. The intra-field interpolation process performed to reconstruct each of missing pixels by using an edge-oriented interpolation process that averages of a pair of pixels in the same spatial orientation and having the minimum value difference and the missing pixels is centered at the pair of pixels. The value of the missing pixel "X" is interpolated with the neighboring pixel pair that has a minimum difference. In other words, the value of a reconstructed missing pixel is a mean value of two pixels of the same orientation that has a minimum difference. As shown in FIG. 7, the "X" symbol denotes a missing pixel 70 with neighboring pixels such as the first neighboring pixel 71, the second neighboring pixel 72, the third neighboring pixel 73, the fourth neighboring pixel 74, the fifth neighboring pixel 75 and the sixth neighboring pixel 76.

More particularly, the first difference U1 is the absolute difference between the first neighboring pixel 71 and the sixth neighboring pixel 76, the second difference U2 is the absolute difference between the second neighboring pixel 72 and the fifth neighboring pixel 75, and the third difference U3 is the absolute difference between the third neighboring pixel 73 and the fourth neighboring pixel 74. The missing pixel 70 is reconstructed according to the minimum difference. If U1 is the minimum difference, the value of the missing pixel is the mean of the value of the first neighboring pixel 71 and the value of the sixth neighboring pixel 76; if U2 is the minimum difference, the value of the missing pixel is the mean of the value of the second neighboring pixel 72 and the value of the fifth neighboring pixel 75; and if U3 is the minimum difference, the value of the missing pixel is the mean of the value of the third neighboring pixel 73 and the value of the fourth neighboring pixel 74. Moreover, a median filtering process is employed to obtain a reconstructed value of the missing pixel 70. The median filtering process is used to limit the reconstruction error. In the present embodiment, a median value of the value obtained from the intra-field interpolation, the value of the second neighboring pixel 72 and the value of the fifth neighboring pixel 75 is obtained to reconstruct the value of the missing pixel 'X' 70.

Figure 8:
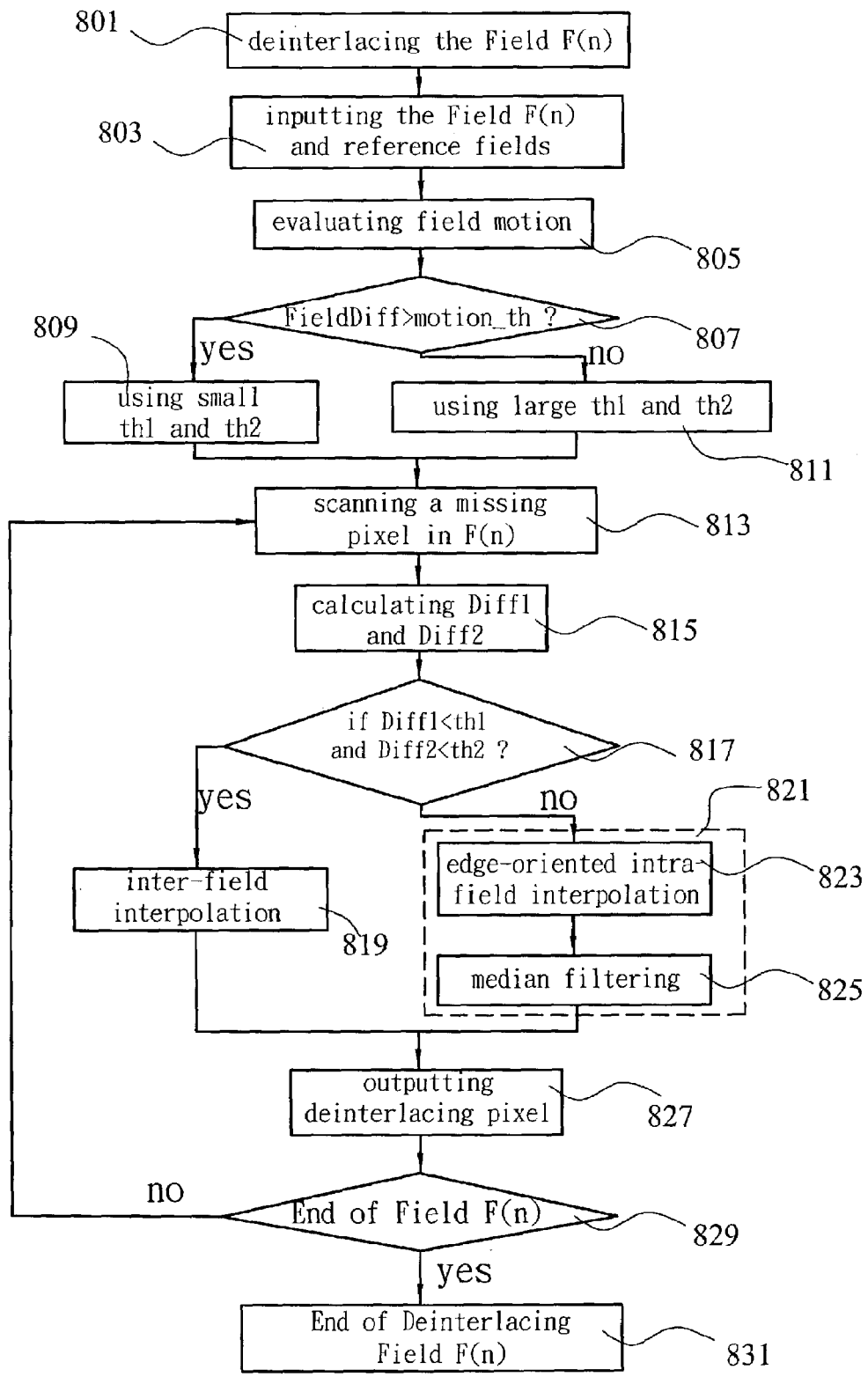
FIG. 8 is a flow chart showing a motion-adaptive de-interlacing algorithm with adaptive thresholds in accordance with another preferred embodiment of the present invention.

FIG. 8 is a flow chart showing a motion-adaptive de-interlacing algorithm with adaptive thresholds in accordance with another preferred embodiment of the present invention, and values of a plurality of adaptive thresholds are linearly varied according to the amount of motion among the field and the reference fields, then the linear adjustment of the adaptive thresholds can be performed by constructing a look up table that includes of a plurality of value pairs for the adaptive thresholds at a plurality of corresponding ranges of motion amount. In the present embodiment, a first difference Diff1 and a second difference Diff2 are obtained according to the difference among fields as shown in FIG. 6. Also, two corresponding adaptive thresholds are provided to evaluate the missing pixel is in a static region or in a non-static region. As shown in FIG. 8, the field F(n) is to be de-interlaced (step 801). A de-interlacing processor inputs the third field F(n) 65, the first field F(n−2) 61, the second field F(n−1) 63 and the fourth field F(n+1) 67 (step 803). After that, the motion information in field F(n) is evaluated by calculating the field difference FieldDiff (step 805). Then, the field difference FieldDiff is compared with a motion threshold motion_th (step 807) to evaluate whether the field F(n) is a high motion field or a low motion field. If the field difference FieldDiff is larger than motion threshold motion_th, a small first threshold th1 and a small second threshold th2 are used (step 809); otherwise, a large first threshold th1 and a large second threshold th2 are used (step 811).

Furthermore, the missing pixels in the field F(n) is scanned and interpolated in the raster order, from top-left to bottom-right (step 813). For a missing pixel, the first difference Diff1 and the second difference Diff2 are calculated (step 815) according the method illustrated in FIG. 6. The first difference Diff1 is calculated using the first field F(n−2) 61 and the third field F(n) 65; while the second difference Diff2 is calculated using the second field F(n−1) 63 and the fourth field F(n+1) 67. The calculated differences Diff1 and Diff2 are then compared to the corresponding thresholds th1 and th2 (step 817) so as to evaluate whether the missing pixel is in a static region or in a non-static region. If the first differences Diff1 is smaller than the first threshold th1 and the second differences Diff2 is smaller than the second threshold th2, the region where the missing pixel locates is a static region, and therefore the missing pixel is reconstructed using an inter-field interpolation process (step 819). However, if the first difference Diff1 is larger than or equal to the first threshold th1 or the second difference Diff2 is larger than or equal to the second threshold th2, the region where the missing pixel locates contains motion, and therefore the missing pixel is reconstructed using the intra-field interpolation process (step 821) according to FIG. 7. The intra-field interpolation process (step 821) comprises an edge-oriented intra-field interpolation process (step 823) and a median filtering process (step 825). The median filtering process is employed (step 825) to obtain a reconstructed de-interlaced pixel. After that, the reconstructed de-interlaced pixel is output (step 827) and whether the end of field F(n) being de-interlaced is reached is evaluated (step 829). If yes, field F(n) is stopped being de-interlaced (step 831); otherwise, the procedure returns to step 805 and these static region detection and interpolation processes repeat until all the missing pixels in field F(n) have been reconstructed.

According to the above discussion, the present invention discloses a method for motion pixel detection with adaptive thresholds so as to correctly evaluate whether a missing pixel is in a static region or in a non-static region, thereby reconstructing the missing pixel by an inter-field interpolation process or an intra-field interpolation process, respectively. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for motion pixel detection with adaptive thresholds, included in a method for reconstructing missing pixels in an interlaced video field, said reconstructing method comprising steps of:
   a) inputting said interlaced video field and at least two reference fields;
   b) evaluating an amount of motion among said reference fields;
   c) adjusting at least one threshold dynamically according to said amount of motion among said reference fields;
   d) scanning each of said missing pixels in a raster order;
   e) calculating a first difference among pixels neighboring each of said missing pixels;
   f) comparing said first difference with said threshold;
   g) reconstructing each of said missing pixels by using an inter-field interpolation process if said first difference is smaller than said threshold;
   h) reconstructing each of said missing pixels by using an intra-field interpolation process if said first difference is larger than or equal to said threshold;
   i) outputting a reconstructed said missing pixels to said interlaced video field; and
   j) evaluating whether the scanning and reconstructing processes reaching the end of said interlaced video field.

2. The method for motion pixel detection with adaptive thresholds as recited in claim 1, wherein said missing pixels are those pixels discarded in frame-to-field conversion for current said video field being de-interlaced.

3. The method for motion pixel detection with adaptive thresholds as recited in claim 1, wherein said reference fields are said preceding field prior to said interlaced video field and said next field posterior to said interlaced video field.

4. The method for motion pixel detection with adaptive thresholds as recited in claim 1, wherein there is high amount of motion among said reference fields if said field difference is large, and there is small amount of motion among said reference if said field difference is small.

5. The method for motion pixel detection with adaptive thresholds as recited in claim 1, wherein said adaptive threshold is set to be small if there is high motion amount among said reference fields while said threshold is set to be large if there is low motion amount among said reference fields.

6. The method for motion pixel detection with adaptive thresholds as recited in claim 1, wherein said difference is the sum of absolute difference of neighboring pixels in said preceding field and said next field.

7. The method for motion pixel detection with adaptive thresholds as recited in claim 1, wherein said inter-field interpolation process is used to reconstruct each of said missing pixels if said difference is smaller than said adaptive threshold and said intra-field interpolation process is used to reconstruct each of said missing pixels if said difference is larger than or equal to said adaptive threshold.

8. The method for motion pixel detection with adaptive thresholds as recited in claim 1, wherein said inter-field interpolation process is used to reconstruct each of said missing pixel by averaging a value of a pixel in said preceding field and a value of a pixel in said next field at the same spatial locations as said missing pixel.

9. The method for motion pixel detection with adaptive thresholds as recited in claim 1, said intra-field interpolation process is used to reconstruct each of said missing pixels by averaging a value of a first pixel above said missing pixel and a value of a second pixel below said missing pixel.

10. The method according to claim 1, wherein:
 a) in the inputting step a), the at least two reference fields includes three reference fields;
 b) the evaluating step b) includes evaluating an amount of motion of among the interlaced video field and the three reference fields;
 c) the adjusting step c) includes adjusting two adaptive thresholds including a first threshold and a second threshold according to the amount of motion of among the interlaced video field and the three reference fields by referring to a motion threshold;
 d) the calculating step e) includes calculating the first difference among pixels neighboring each of said missing pixels in said field and said reference fields of a same parity as same field and calculating a second difference among pixels neighboring each of said missing pixels in said field and said reference fields of an opposite parity to said field;
 e) the comparing step f) includes comparing the first difference and the second difference respectively with the first threshold and the second threshold;
 f) the reconstructing step g) includes reconstructing each of the missing pixels by using an inter-field interpolation process if the first difference is smaller than the first threshold and the second difference is smaller than the second threshold; and
 g) the reconstructing step h) includes reconstructing each of the missing pixels by using an intra-field interpolation process if the first difference is larger than or equal to the first threshold and the second difference is larger than or equal to the second threshold.

11. The method for motion pixel detection with adaptive thresholds as recited in claim 10, wherein said reference fields are a plurality of preceding fields prior to said current field and one next field posterior to said current field if said current field is a top-field.

12. The method for motion pixel detection with adaptive thresholds as recited in claim 10, wherein said reference fields are one preceding fields prior to said current field and a plurality of next field posterior to said current field if said current field is a bottom-field.

13. The method for motion pixel detection with adaptive thresholds as recited in claim 10, wherein said amount of motion among said current field and said reference fields is obtained by calculating a total said field difference summed up by one said field difference between said current field and said reference field of the same parity, and another said field difference between said reference fields with opposite parity to said current field.

14. The method for motion pixel detection with adaptive thresholds as recited in claim 10, wherein said two thresholds are set to large, if said amount of motion is smaller than said motion threshold; otherwise, said two adaptive thresholds are set to small if said amount of motion is larger than or equal to said motion threshold.

15. The method for motion pixel detection with adaptive thresholds as recited in claim 10, wherein the value of said a plurality of adaptive thresholds are linearly varied according to said amount of motion among said field and said reference fields.

16. The method for motion pixel detection with adaptive thresholds as recited in claim 15, wherein said linear adjustment of said adaptive thresholds can be performed by constructing a look up table that consists of a plurality of value pairs for said adaptive thresholds at a plurality of corresponding ranges of motion amount.

17. The method for motion pixel detection with adaptive thresholds as recited in claim 16, wherein said median filtering process is used to obtain a median value among the intra-field interpolated value and pixel values neighboring said missing pixel.

18. The method for motion pixel detection with adaptive thresholds as recited in claim 10, wherein said inter-field interpolation process performed to reconstruct each of said missing pixels by averaging a value of a pixel in said preceding field and a value of a pixel in said next field at the same spatial location as said missing pixel.

19. The method for motion pixel detection with adaptive thresholds as recited in claim 10, wherein said intra-field interpolation process performed to reconstruct each of said missing pixels by using an edge-oriented intra-field interpolation process that averages a pair of pixels in the same spatial orientation and having the minimum value difference and said missing pixels is centered at said pair of pixels.

20. The method for motion pixel detection with adaptive thresholds as recited in claim 19, wherein said edge-oriented intra-field interpolation process, a median filtering process is applied to limit the reconstruction error of said missing pixel.

* * * * *